June 28, 1938. W. BUSCHBECK 2,121,855
COUPLING HIGH FREQUENCY APPARATUS
Filed Aug. 10, 1935 2 Sheets-Sheet 1

INVENTOR
WERNER BUSCHBECK
BY H.S. Grover
ATTORNEY.

June 28, 1938.  W. BUSCHBECK  2,121,855
COUPLING HIGH FREQUENCY APPARATUS

Filed Aug. 10, 1935  2 Sheets-Sheet 2

INVENTOR
WERNER BUSCHBECK
BY
ATTORNEY

Patented June 28, 1938

2,121,855

UNITED STATES PATENT OFFICE 2,121,855

COUPLING HIGH-FREQUENCY APPARATUS

Werner Buschbeck, Berlin, Germany, assignor to Telefunken Gesellschaft für Drahtlose Telegraphie m. b. H., Berlin, Germany, a corporation of Germany Application August 10, 1935, Serial No. 35,598
In Germany July 5, 1934

13 Claims. (Cl. 178—44)

This invention relates to a mode of constructing connecting high frequency transmission lines for the coupling together of a high-frequency arrangement which is unsymmetrical with respect to ground potential, and also another high-frequency arrangement, it being symmetrical with respect to ground potential.

This invention is an addition to German Patent No. 568,559, and relates to an improved method of producing the arrangement according to the above mentioned patent and which also serves for the coupling together of two high-frequency transmission lines, one being unsymmetrical and the other one being symmetrical with respect to ground potential. According to the above mentioned German patent, the connection is carried out in such manner that the conductors having their voltages symmetrical with respect to ground, are branched off across connecting lines of correspondingly different electrical lengths, from a common voltage carrying part of the unsymmetrical arrangement. The difference in length of the two branches of the connecting device depends upon the operating frequency and has a value equal to an odd number of half waves, hence at least $$\frac{\lambda}{2}$$

If, for instance, the two resistances at the two sides of the connecting device, and which have to be adapted to each other, are ohmic resistances.

The arrangement of the connecting lines described in the German patent is very well suited for a single fixed and given wave length, but difficulties arise when it is desired to change the wave length, since the difference in length of the two branches must be changed in accordance with the change in wave length. Changing the length of one branch by shifting a short-circuit bridge along two parts of the branch to be adjusted and which are bent to this end into parallel directions, is not advisable due to the then occurring action of the dead ends. A trumpet-like shape of the part to be adjusted permits at the most a change of the wave range in the proportion 1:2. It is the object of the present invention to provide a possibility of adaptation for changes in wave length ranges of practically any width.

In accordance with the invention, the arrangement suited to this end is such that a concentric transmission line with the surge impedance W and serving for carrying out the connection to the unsymmetrical high-frequency transmission line arrangement has a gradually or not gradually adjustable connecting means to a ring-sector-line or coil-shaped, likewise concentric transmission line, having the surge impedance 2W, and that the parts of this last-mentioned line, placed at various sides of the variable connecting means, appertain to different branches of the connecting line.

Several embodiments of the arrangement in accordance with the invention are represented in the drawings by way of example.

Figures 1 and 1a represent a top view and elevation respectively, of a structure in accordance with the invention, whereby, for the sake of clearness, the part of the ring-shaped line which lies in front of the section plane I—I, of Figure 1, is omitted from Figure 1a.

Fig. 3a is a partial section of Fig. 3 showing a solid split insulating member used as a dielectric around the inner conductor; while

As indicated in these figures, a concentric transmission line E comprising an inner conductor F and an outer enveloping part or conductor G, is bent into a partial circle. The ends C and D of the interior line are connected for instance, either directly or across suitable intermediate lines, to a high-frequency power source P which is symmetrical with respect to ground potential. The surge impedance of the line E is 2W. A branch line H, having surge impedance W, makes sliding contact with line E and is rotatably and concentrically arranged thereto, the contact being established by the fact that the outer part J of line H is electrically connected to the outer part G of the circular line, while the inner conductor K is electrically connected with the inner branch line F. The extension J', K' of the take-off cable can now be used for feeding the consumer or output which is unsymmetrical with respect to ground potential, for instance, in that the enveloping part J is grounded, and the inner conductor K is connected to the voltage carrying part of the consumer.

The sliding of the arm K on the inner conductor F is made possible by inserting said arm through a slot M so cut into the part G as to permit the required range of displacement. Contact between arm K and part G will be avoided in the simplest manner by placing a suitable insulating sleeve N over the arm K where it passes through the slot M. In order to cover the slot, there may be connected to the said insulating sleeve, a strip (preferably metallic) of the shape of a ring segment, gliding over the slot M, and closing the same.

If for a certain wavelength λ, the difference in length of the two branches of the connecting line is to be $$\frac{\lambda}{2}$$

the connecting point B of the rotatable branch off line H is so adjusted at the ring line G, that the line BA has the length $$\frac{\lambda}{4}$$

Then the right-hand branch BAD of the ring line has a length greater by the distance $$2AB = \frac{\lambda}{2}$$

than that of the left-hand branch BC. If the input points CD of the ring line are supplied at 180° phase difference by the symmetrical voltage source P, a further difference of 180° will be added to the aforementioned difference, so that these two ends have now voltages of equal phase in the common branch off point B, and can feed the unsymmetrical consumer in parallel across the branch off cable H. Since each of the two branches of the ring line have the surge impedance 2W, their parallel connection has the impedance W, hence the same impedance as that of the branch off cable. Thus, the connection is reflection-free, and independent of the absolute length BC and BD, respectively.

Figure 1:
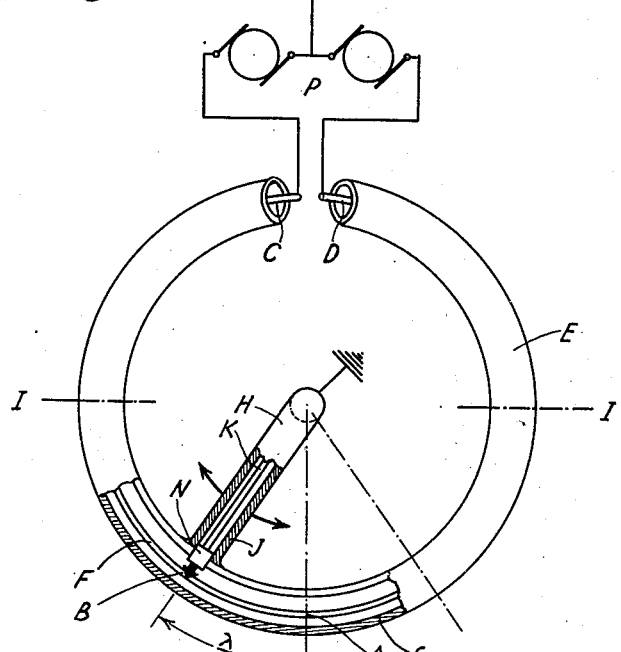

If the position of the branch off arm shown in Figure 1 corresponds with the minimum wavelength $\lambda_{mi}$ of the wave range, then at an increase of the wavelength, the difference in length of the two branches must be increased, i. e., the arm H on the left-hand part BC must be turned in the direction towards the end C. If the entire branch BC is intended to be utilized for the control, the ring must be so dimensioned that at the greatest wavelength $\lambda_{ma}$ to be taken in consideration, the arm H be located at the end C. The length of the ring portion at which the arm H slides, is determined by the condition that the section AB corresponding with the minimum wavelength, is equal to $$\frac{\lambda_{mi}}{4}$$

and in like manner the section A C is equal to $$\frac{\lambda_{ma}}{4}$$

The section BC used for the adjustment, therefore, has the length $$\frac{\lambda_{ma}}{4} - \frac{\lambda_{mi}}{4}$$

Figure 2:
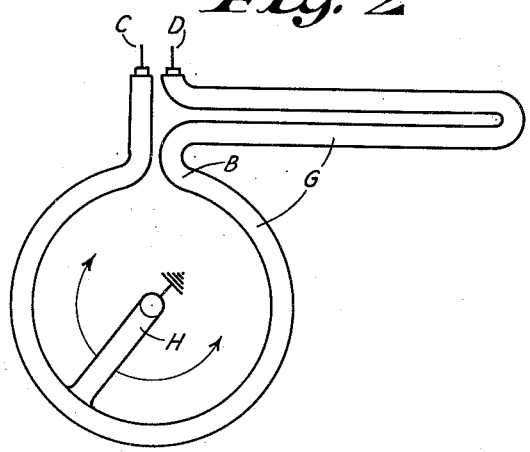
Fig. 2 is a diagram of a modification of Fig. 1.

Since the remaining part BAD whose length is ¼ ($\lambda_{ma}+\lambda_{mi}$) is not used for variation at wave change, its shape is immaterial, and need not necessarily have the shape of a ring sector. It is sufficient to only give the part CB the shape of a ring of the circumference ¼ ($\lambda_{ma}-\lambda_{mi}$) and to form the remaining distance BD having the electrical length ¼ ($\lambda_{ma}+\lambda_{mi}$), as simple return line. Such an arrangement is represented in Figure 2 which, in view of the aforementioned, will be readily understood.

Figure 3A:
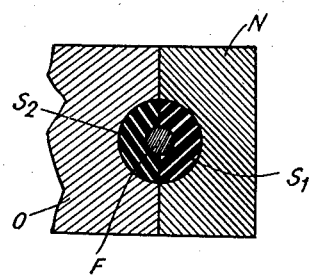
Figure 1A:
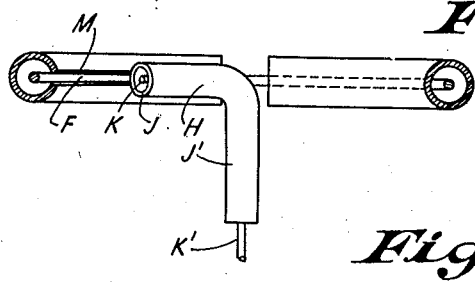
Figure 3:
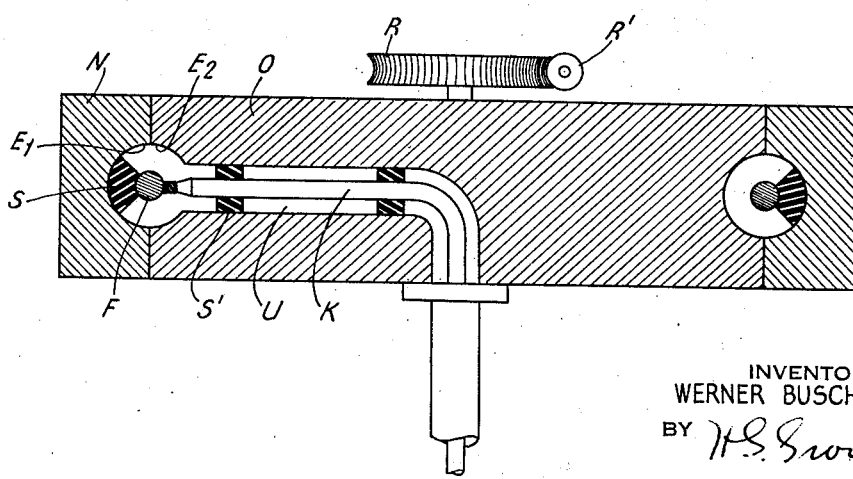
Fig. 3 is a sectional view of another form of a variable transmission line element.

If the ring-shaped line having a slot in the outer conductor for the passage of the sliding arm, shall be avoided, an arrangement can be resorted to, for instance, in accordance with Figure 3. In this arrangement, the interior annular conductor F is mounted on insulators S placed within a stationary annular body N in which a body O is rotatably arranged, and operated, for instance, by means of a worm drive RR'. The body O has a canal U within which the conductor K is securely mounted on insulators S'. In turning the body O, the end of the arm K slides on the ring line F. The two bodies N and O can be of metal. If they are made of insulating material, the surfaces $E_1$, $E_2$, as well as the walls of the canal U must be metallized in order to obtain conducting enveloping surfaces. Where it is intended to considerably diminish the size of the apparatus, the space between the interior conductors and enveloping surfaces can be filled out by means of any liquid or solid dielectric having a high dielectric constant. In this case the electric wavelength will be decreased in comparison with the air-filled line in the proportion $$1 : \sqrt{\epsilon}$$

If a solid dielectric is used, it will preferably be formed of two annular cups $S_1$, $S_2$, as shown in Figure 3a (representing a right-hand part of an arrangement similar to that shown in cross section in Figure 3), whereby the cup $S_1$ together with the inner conductor F supported by said cup $S_1$, is fixedly secured within the body N, while the cup $S_2$ rotates with the body O.

If, in the case of large wave ranges, the simple ring then becomes inconveniently large, it can of course also be wound into a coil. The arrangement combining such coil with the arrangement according to Figures 1 and 2 is self-explanatory.

Figure 4:
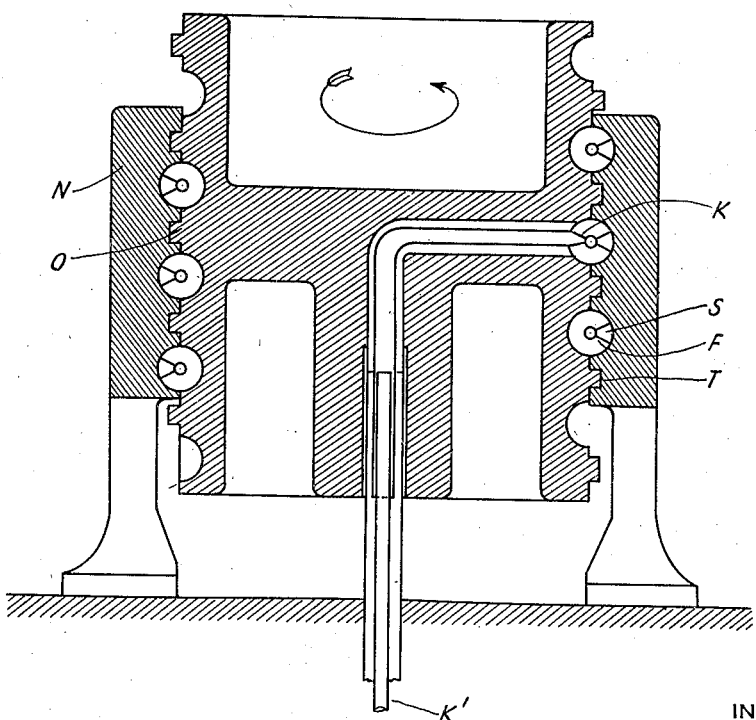
Fig. 4 is a sectional view of a variable element of a transmission line having a screw thread arrangement.

Figure 4 shows a coil-shaped embodiment of the line utilizing the arrangement in accordance with Figure 3. In this device the movable body O is screwed into the stationary body N by means of corresponding threads T, so that the end contact member of the branch off arm K always slides, during the screw movement, on the windings of the interior conductor F.

Having thus described my invention, what I claim is:

1. A device for coupling together a high frequency transmission line which is unsymmetrical with respect to ground potential and another high frequency transmission line which is symmetrical, said device comprising a ring-like outer conductor and a ring-like inner conductor whose electrical length is an odd multiple of a half wavelength, each conductor being concentrically arranged with respect to each other, a variable connection arranged to make contact with the inner conductor whereby the unsymmetrical portion of the line is altered.

2. A device for coupling together a high frequency transmission line which is unsymmetrical with respect to ground potential and another high frequency transmission line which is symmetrical, said device comprising a ring-like fixed outer conductor and a ring-like inner conductor whose electrical length is an odd multiple of a half wavelength, each conductor being concentrically arranged with respect to each other, a movable element arranged to make contact with the inner conductor whereby the unsymmetrical portion of the line is altered.

3. A device for coupling together a high frequency transmission line which is unsymmetrical with respect to ground potential and another high frequency transmission line which is symmetrical, said device comprising a ring-like outer conductor and a ring-like inner conductor whose electrical length is an odd multiple of a half wavelength, each conductor being concentrically arranged with respect to each other, a variable connection arranged to make contact with the inner conductor whereby the unsymmetrical portion of the line is altered, and a liquid dielectric interposed between said inner and outer conductors.

4. A device for coupling together a high frequency transmission line which is unsymmetrical with respect to ground potential and another high frequency transmission line which is symmetrical, said device comprising a ring-like outer conductor and a ring-like inner conductor whose electrical length is an odd multiple of a half wavelength, each conductor being concentrically arranged with respect to each other, a variable connection arranged to make contact with the inner conductor whereby the unsymmetrical portion of the line is altered, and a solid dielectric interposed between said inner and outer conductors.

5. A device for coupling together a high frequency transmission line which is unsymmetrical with respect to ground potential and another high frequency transmission line which is symmetrical, said device comprising a ring-like outer conductor and a ring-like inner conductor whose electrical length is an odd multiple of a half wavelength, each conductor being concentrically arranged with respect to each other, a variable connection arranged to make contact with the inner conductor whereby the unsymmetrical portion of the line is altered, and a dielectric interposed between said inner and outer conductors which has a higher dielectric constant than that of the transmission line.

6. A device for coupling together a high frequency transmission line which is unsymmetrical with respect to ground potential and another high frequency transmission line which is symmetrical, said device comprising a coil-like inner and outer conductor whose electrical length is equal to an odd multiple of a half wavelength, each conductor being concentrically arranged with respect to each other, a single variable arm arranged to make contact with said inner conductor whereby the unsymmetrical portion of the transmission line is altered.

7. A device for coupling together a high frequency transmission line which is unsymmetrical with respect to ground potential and another high frequency transmission line which is symmetrical, said device comprising a coil-like inner and outer conductor whose electrical length is an odd multiple of a half wavelength, each conductor being concentrically arranged with respect to each other, a single variable arm arranged to make contact with said inner conductor whereby the unsymmetrical portion of the transmission line is altered by a screw thread which is rotated so as to vary said arm.

8. A transmission line arrangement for connecting a first device operating symmetrically with respect to ground to a second device which is unsymmetrical with respect to ground comprising a transmission line whose length is not negligible with respect to the wavelength of the energy to be transmitted, a second transmission line having a characteristic impedance of one-half that of the first mentioned line, means for connecting one portion of said second line to a portion of said first line at a point whose electrical distance from one terminal of said first device is an odd multiple of a half wavelength different from its electrical distance to the other terminal.

9. A transmission line arrangement for connecting a first device operating symmetrically with respect to ground to a second device having two terminals, one terminal of which is unsymmetrical with respect to ground comprising a transmission line having a first inner and outer conductor whose length is not negligible with respect to the wavelength of the energy to be transmitted, the ends of the inner conductor being connected to the terminals of said first device, a second transmission line having an inner and outer conductor with a characteristic impedance of one-half that of the first mentioned transmission line, the outer conductor of said first and second transmission lines being operated at a fixed potential, one end of the inner conductor of said second line being connected to at least one terminal of said second device, means for connecting the other end of the inner conductor of said second line to a portion of said first line at a point whose electrical distance from one terminal of said first device is an odd multiple of one-half a wavelength different from its electrical distance to the other terminal.

10. A transmission line arrangement for connecting a first device operating symmetrically with respect to ground to a second device having two terminals, one terminal of which is unsymmetrical with respect to ground comprising a transmission line having a first inner and outer conductor whose length is not negligible with respect to the wavelength of the energy to be transmitted, the ends of the inner conductor being connected to the terminals of said first device, a second transmission line having an inner and outer conductor with a characteristic impedance of one-half that of the first mentioned transmission line, the outer conductor of said first and second transmission lines being operated at a fixed potential, one end of the inner conductor of said second line being connected to at least one terminal of said second device, means for varying an electrical connection to change its physical position on said inner conductor to establish the relation of electrical distances from any desired operating frequency within a predetermined range of frequencies.

11. A device for coupling together a high frequency transmission line which is unsymmetrical with respect to ground potential and another high frequency transmission line which is symmetrical, said device comprising a coil-like inner and outer conductor whose electrical length is equal to an odd multiple of a half wave length, each conductor being concentrically arranged with respect to each other, a slot in said outer conductor, a single variable arm arranged to move in said slot and make contact with said inner conductor whereby the unsymmetrical portion of the transmission line is altered.

12. A device for coupling together a high frequency transmission line which is unsymmetrical with respect to ground potential and another high frequency transmission line which is symmetrical, said device comprising a coil-like inner and outer conductor whose electrical length is an odd multiple of a half wave length, each conductor being concentrically arranged with respect to each other, and a slot in said outer conductor, a single variable arm arranged to move in said slot and make contact with said inner conductor whereby the unsymmetrical portion of the transmission line is altered by a screw thread which is rotated so as to vary said arm.

13. A device for coupling together a high frequency transmission line which is unsymmetrical with respect to ground potential and another high frequency transmission line which is symmetrical, said device comprising a coil-like inner and outer conductor whose electrical length is equal to an odd multiple of a half wave length, each conductor being concentrically arranged with respect to each other, a slot in said outer conductor, a single variable arm arranged to move in said slot and make contact with said inner conductor whereby the unsymmetrical portion of the transmission line is altered, and a sliding metallic member gliding over said slot to close the slot when said arm is moved.

WERNER BUSCHBECK.